INVENTOR
Marcel Wilhelm Züblin
BY Pennie, Edmonds,
Morton, Taylor and Adams
ATTORNEYS Jan. 24, 1967 M. W. ZÜBLIN 3,300,136
THERMOSTATIC FLOW REGULATING VALVE
Filed July 23, 1964 2 Sheets-Sheet 2
FIG. 2
FIG. 3
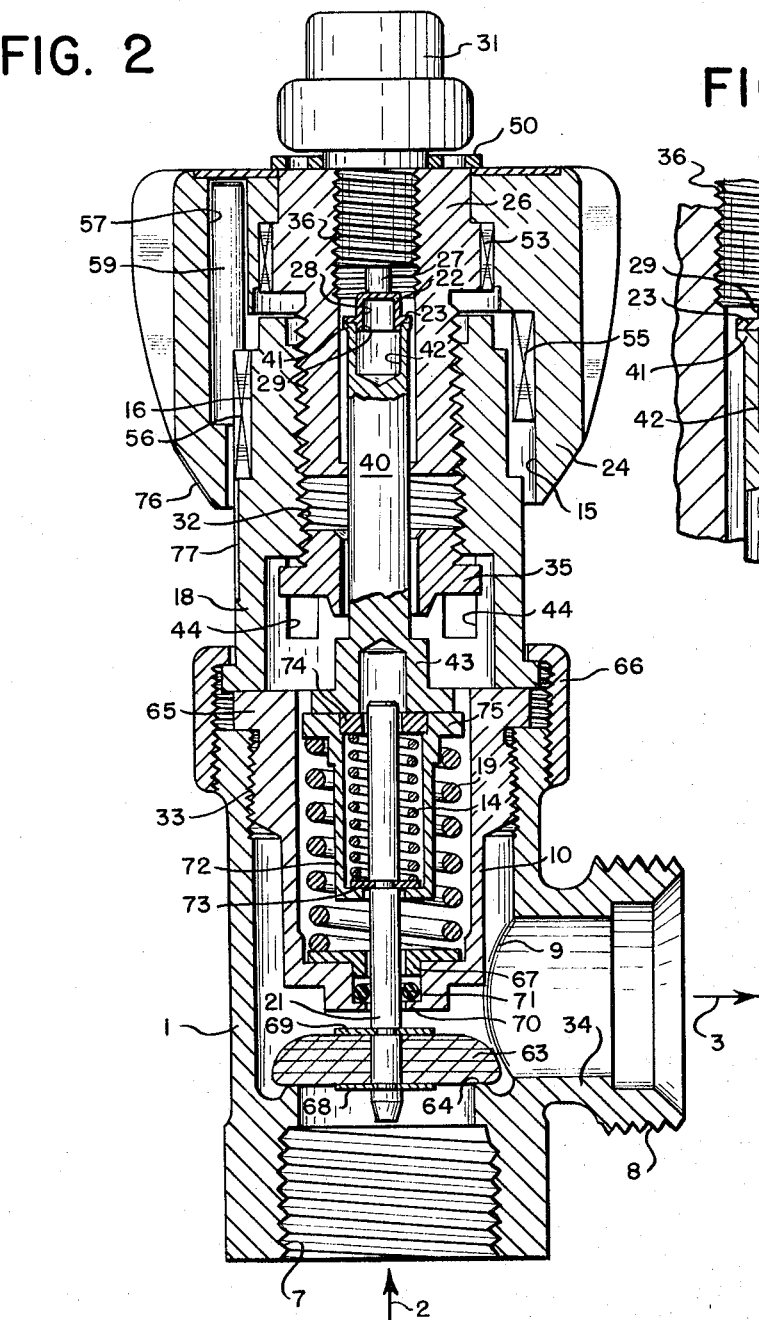
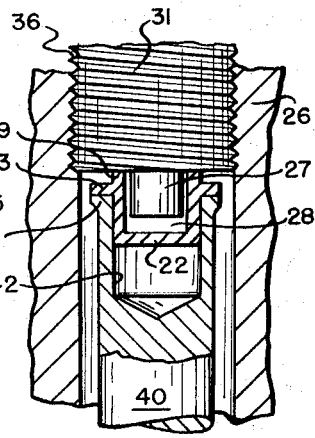
INVENTOR
Marcel Wilhelm Züblin
BY *Pennie, Edmonds,*
*Morton, Taylor and Adams*
ATTORNEYS United States Patent Office 3,300,136
Patented Jan. 24, 1967

3,300,136
THERMOSTATIC FLOW REGULATING VALVE
Marcel Wilhelm Züblin, London, England, assignor to Sulzer Bros. Inc., New York, N.Y., a corporation of New York
Filed July 23, 1964, Ser. No. 404,197
Claims priority, application Switzerland, July 23, 1963, 9,192/63
4 Claims. (Cl. 236—99)

This invention relates to valves, and more particularly to thermostatically operated valves for control of the flow of a fluid, as in space heating or cooling for example. The present invention provides such a valve in which the thermostatic element effects motion of an actuating pin, which motion can be communicated to a closing member spring-loaded to open position so as to effect opening or closing of the valve in accordance with changes in ambient temperature.

More particularly, in the valve of the invention, the valve closing member is affixed to a spindle passing through a first cup-shaped member fixed in the valve body, with a fluid tight seal being provided between the valve stem and this cup. This cup constitutes a guide for the spindle. A second apertured cup constituting an annular member fits about the valve spindle within the first cup-like member, and engages the spindle at an abutment thereon which may take the form of a collar. A first spring is engaged between the first cup-like member and the second, urging the second cup-like member and with it the spindle in valve-opening direction. A second spring is engaged between the second cup-like member and the collar on the spindle, stressing that second member against the collar. The first cup-like member or guide seals the fluid flow space about the valve seal from the remainder of the valve structure.

The motion of the thermostat actuating pin is communicated to a spindle connecting member which rests on the second cup-like member. Upon rise in temperature from an initial low value, say, in which the valve is open, the motion of the actuating pin drives the second cup-like member, and with it the valve spindle, against the stress of the first spring, until the valve is closed. Further motion of the actuating pin can then take place by unseating of the second cup-like member from the collar on the valve spindle.

The present invention constitutes a modification of and improvement on the valve shown in British Patent No. 946,275.

The invention will now be further described with reference to the accompanying drawings in which:

FIG. 2 is a view similar to that of FIG. 1 but illustrating another embodiment of the invention; and FIG. 3 is a fragmentary view of an enlarged scale of the valve of FIG. 2, with one of the elements thereof in reversed position.

Figure 1:
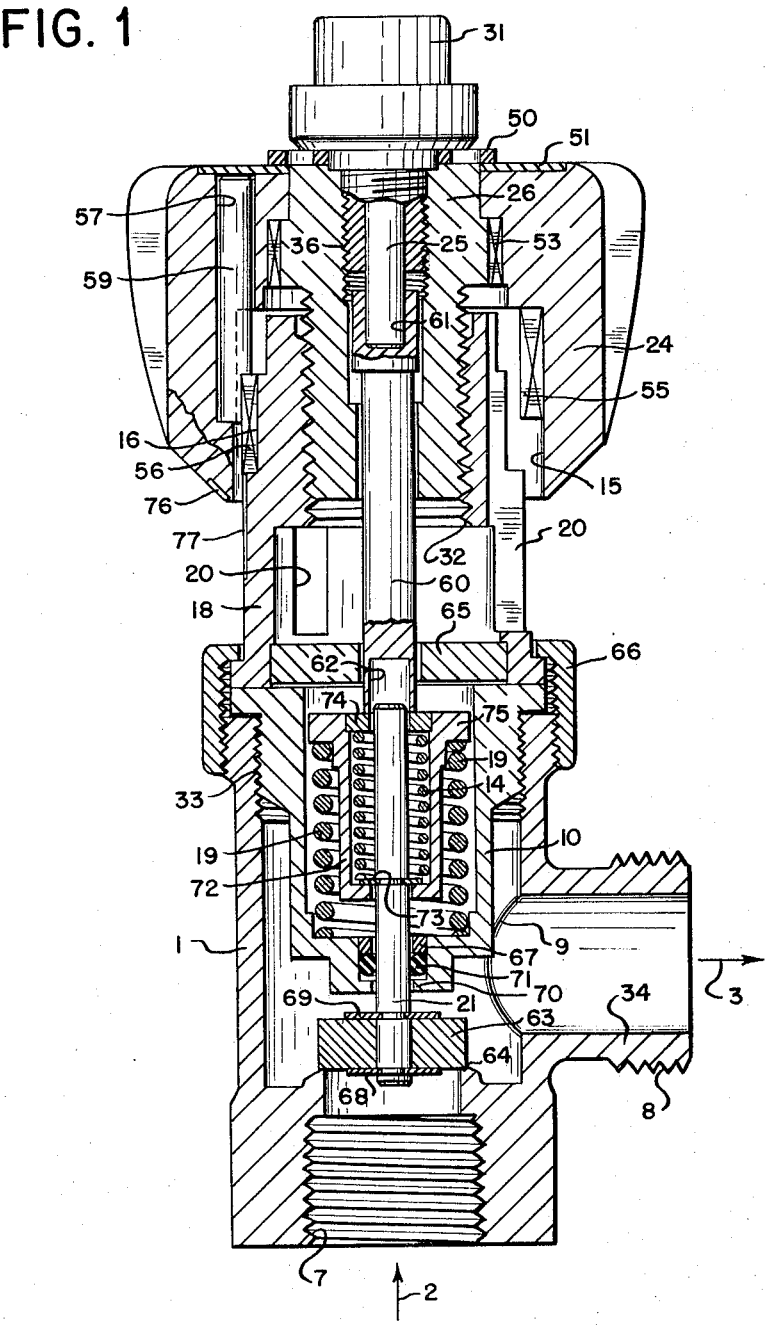
FIG. 1 is a vertical sectional view through one form of valve according to the invention.

Referring to FIG. 1, the flow regulating valve there illustrated is adapted to be fitted to hot water piping at the inlet to a radiator and comprises a cylindrical valve body 1 having a screwthread 7 for connection to the piping; the valve body 1 is formed with a lateral aperture 9 opening into a connector 34 formed with a screwthread 8 for connection to the radiator. The hot water enters the valve as indicated by the arrow 2 and leaves the valve through the connector 34 to enter the radiator in the direction indicated by the arrow 3. That end of the valve body 1 which is remote from the inlet has an internal screwthread 33 in which is screwed a first cup-like member 10, and also has an external screwthread on which is screwed a ring nut 66 which holds in place a sleeve 18. At the end of the sleeve 18 which is at the top in FIG. 1 there is a coarse-pitch screwthread 32 into which an adjusting member 26 is screwed.

A grip ring 24 is connected to the adjusting member 26 by splines 53. With the help of these splines, upon removal of a snap ring 50, the parts 24 and 26 may be engaged in any one of plural relative angular positions. At the top of the adjusting member 26 there is a disc 51 which is held in place by the snap ring 50 so that the disc 51 turns with the adjusting member and the grip ring. The grip ring 24 carries temperature graduations at its lower edge, as indicated at 76 in FIG. 1, and these can be read off against an index mark 77 on the sleeve 18. By suitably adjusting the angular relationship of elements 24 and 26 at their splined engagement, these temperature graduations may be made properly to reflect the temperature which the connected radiator will maintain in the space containing that radiator and the valve of the invention.

The grip ring 24 exhibits a generally cylindrical cavity 15, from the wall of which there projects inwardly a tooth or key 55. A corresponding tooth 56 projects radially outward from a cylindrical set-back surface 16 on sleeve 18 adjacent the upper end thereof. The teeth 55 and 56 are of small circumferential extent but interfere with each other so as to limit the rotation of the grip ring (and parts fixed with respect thereto) relative to the sleeve 18 to less than one complete revolution, for instance, to an angle of 330°.

The grip ring 24 is formed with a number of bores 57, only one of which is visible in the drawing. By inserting two pins into two adjacent apertures 57 on opposite sides of the abutment 56, the grip ring 24 can be prevented from rotating relatively to the sleeve 18. This locking can be effected only after the disc 51 has been removed, for only then are the apertures 57 accessible. Because of this locking feature, a room temperature once set on the thermostat can be fixed because then the adjusting member 26 cannot be rotated.

The adjusting member 26 is formed with an axial passage tapped with a screwthread 36 into which the housing of a thermostat 31 is screwed.

The thermostat 31 may be of the type described in British Patent No. 946,275.

The thermostat actuating pin 25 is connected, for transfer of compressive stresses, to a valve spindle 21 via a spindle connection member 60. The member 60 is formed with a top recess 61 which receives the pin 25 and in its bottom end there is another recess 62.

The spindle 21 is drawn upwardly in the drawing by a helical compression spring 19 which bears against the bottom of the first cup-like member 10 and also against a flange 75 of a second cup-like member 72 the lower end of which engages beneath a snap ring 73 fitted in a groove in the spindle 21. Seating on the snap ring 73 is a helical compression spring 14 the other end of which bears upwardly on a ring 74 which may be pressed into (i.e., fixed with respect to) the second cup-like member 72 and which ring 74 bears against the lower end of the spindle connection member 60. A movable flow-regulating or closure member 63 is secured to the spindle 21 between two snap rings 68 and 69. The member 63 can close on to a seating 64.

If the valve is closed, by engagement of member 63 on its seat 64, upon any further downward movement of the spindle connection member 60, due either to the grip ring 24 being turned or to the ambient temperature rising still further (with consequent thermostatically induced lowering of pin 25), the cup 72 will be driven downwardly. The ring 74 on which the periphery of lower end of member 60 abuts has a press fit in the upper end of cup 72 and is hence stationary with respect thereto. Upon such further downward movement of member 60, spring 19 will be further compressed between the flange 75 of cup 72 and the bottom of stationary cup 10. Spring 14 will likewise be further compressed, between ring 74 in cup 72 and the snap ring 73 which is fixed on valve spindle 21. Consequently, with such downward movement of member 60, the top of the spindle 21 will be caused to penetrate further into the recess 62 in the lower end of member 60. When the valve is open, movement of the spindle 21 in the opening direction is limited by engagement of the snap ring 69 with the underside of the stationary cup-like member 10.

The sleeve 18, which is formed with apertures 20 through which the ambient air can pass, and the spindle connection member 60, are made of a material which is a poor heat conductor, for instance a synthetic resin plastic, and these elements therefore insulate the thermostat 31 against temperature variations due to the heating medium flowing in the direction of the arrows 2 and 3 (or, for that matter, in the opposite direction). The adjusting member 26 and the grip ring 24 can be made of the same or of a different plastic material. The bottom end of the sleeve 18 is closed by a plate 65. The sleeve 18, the grip ring 24, the adjusting member 26, the thermostat 31 and the spindle connection member 60 form a unit which can be removed as a whole from the valve body 1 when the ring nut 66 has been released. This unit, which is made mainly of plastics, can be fitted, for instance, only when the system is about to be put into operation, thus reducing the risk of damage thereto during installation of the space heating system.

The valve spindle 21 passes through a passage in the bottom of the cup-like member 10, and this passage has a widened part which receives a ring 67 which is, for instance, press-fitted into the base of the member 10. An O-ring 71 for sealing the valve spindle 21 is introduced into the space bounded by the lower extremity 70 of the cup-like member 10 and by the ring 67.

The valve spindle 21 and the closure member 63 secured thereto cooperate with the cup-like members 10 and 72 and with the springs 14 and 19 to form a unit which can be removed or introduced as a whole by being screw out of or into the screwthread 33.

The embodiment of FIG. 2 is similar to that of FIG. 1 with two principal changes. In FIG. 2 provision is made selectively to couple the spindle connecting member (for the transmission of compressive stresses) either to the thermostat actuating pin (as in FIG. 1), or to couple it instead exclusively to the casing 31 of the thermostat and thus to the manually operated adjusting member 26. To this end, there is provided a thimble or cup-like member 22 having a shoulder 23 thereon. When inverted, as shown in FIG. 2, this thimble permits the motion of the actuating pin 27 of the thermostat to be communicated to the spindle connecting member 40, the thimble bearing at its shoulder 23 against the rim 41 at the upper end of member 40.

When it is desired to control the valve manually, the thermostat 31 may be withdrawn at the threads 36 and the thimble may then be reversed end for end, into the position shown in FIG. 3, with its recess 28 directed toward the pin 27. The recess 28 is of a diameter large enough to receive the pin 27, and likewise the recess 42 at the upper end of the spindle connecting member 40 is large enough to receive the thimble. The thimble rests at its shoulder 23 on the rim 41 of member 40 as before, but engages at its own rim 29 the thermostat casing 31, which is stationary with respect to the adjusting member 26. The depth of the thimble is such that the pin 27 can execute all of the motion imposed upon it by temperature changes without engaging the thimble and hence without imposing any stress on the member 40.

Additionally, the embodiment of FIG. 2 includes means to limit the motion of the spindle connecting member away from the valve proper. The spindle connecting member 40 of this embodiment, corresponding to the member 60 of FIG. 1, includes at its lower end a shoulder 43 of enlarged diameter. A ring 35 is engaged on the lower end of the female thread 32 of adjusting member 26, and the opening in ring 35 is dimensioned to arrest upward motion of member 40 at the shoulder 43 thereof. In the embodiment of FIG. 2 apertures 44 are provided in the upper body section 18, similar to the apertures 20 of FIG. 1. These apertures 44 serve both to permit the circulation of air through the upper body section so as to hinder the transfer of heat between the upper and lower body sections and also to permit adjustment in the position of the ring 35 on thread 32 without withdrawal of the manually adjustable member 26.

In both embodiments the actuating pin (25 in FIG. 1 and 27 in FIG. 2) receives the motion of a diaphragm constituting part of a casing which defines a sealed chamber within the thermostat 31. This chamber advantageously contains a filling which has a high coefficient of thermal volumetric expansion over a predetermined temperature range and lower coefficients of thermal volumetric expansion above and below that range.

While the application has been described in terms of two preferred embodiments, the invention itself is not limited thereto but rather comprehends all variations and modifications in the structures disclosed falling within the spirit and scope of the appended claims.

I claim:

1. A thermostatically operated valve comprising upper and lower valve body sections, a valve seat in said lower section, a movable valve closing member adapted in one position to close said valve at said seat, an adjusting member movably supported in said upper body section, a thermostat supported by said adjusting member, a spindle affixed to said closing member, guide means for said spindle fixed in said lower body section, an abutment on said spindle, an annular member disposed about said spindle and engageable against said abutment for valve-opening movement of said spindle, a first spring engaged between said guide and annular member urging said annular member in valve-opening direction, a second spring engaged between said annular member and abutment urging said annular member against said abutment, a spindle connection member engaged between said thermostat and annular member, and a reversible element engageable in one position between said spindle connection member and said thermostat, and engageable in the opposite position between said spindle connection member and said adjusting member.

2. A thermostatically operated valve comprising upper and lower valve body sections, a valve seat in said lower section, a movable valve closing member adapted in one position to close said valve at said seat, an adjusting member movably supported in said upper body section, a thermostat supported by said adjusting member, a spindle affixed to said closing member, guide means for said spindle fixed in said lower body section, an abutment on said spindle, an annular member disposed about said spindle and engageable against said abutment for valve-opening movement of said spindle, a first spring engaged between said guide and annular member urging said annular member in valve-opening direction, a second spring engaged between said annular member and abutment urging said annular member against said abutment, a spindle connection member engaged between said thermostat and annular member, a reversible element engageable in one position between said spindle connection member and said thermostat, and engageable in the opposite position between said spindle connection member and said adjusting member, and a shoulder on said spindle connection member engageable against said upper body section to limit motion of said spindle connection member away from said valve seat.

3. A flow regulating valve for regulating the flow of a fluid, the said valve comprising a main body part, a seating in said main body part, a flow regulating member contained within said main body part in variable cooperative relation to said seating, a spindle, means connecting said flow regulating member to said spindle, an auxiliary body part made of a substance which is a poor conductor of heat, means mounting said auxiliary body part on said main body part, a manual adjusting member in adjustable engagement with said auxiliary body part, a thermostat comprising a casing, a diaphragm defining with said casing a sealed chamber, a filling in said chamber which has a high coefficient of thermal volumetric expansion over a predetermined temperature range and lower coefficients of thermal volumetric changes of said filling, said thermostat casing being mounted on said adjusting member, a spindle connection member interposed between said spindle and said actuating element of said thermostat, and selection means having a first selected position engaging said spindle connecting member with said actuating element whereby said spindle and flow regulating member are movable automatically by said thermostat, and a second selected position engaging said spindle connection member with said manual adjusting member whereby said spindle and flow regulating member are movable only by said manual adjusting member.

4. A thermostatically operated valve comprising:
a valve body,
a valve seat in said valve body,
a movable valve-closing member adapted in one position to close said valve at said seat,
a spindle affixed to said valve-closing member,
guide means for said spindle fixed in said valve body,
an abutment on said spindle,
an annular member movably disposed in said valve body about said spindle and engageable against said abutment for valve-opening movement of said spindle,
a first spring engaged between said guide means and annular member urging the latter against said abutment in valve-opening direction,
a second spring engaged between said annular member and abutment urging said annular member against said abutment in valve-opening direction,
a sleeve affixed to said valve body, said sleeve having a plurality of apertures formed therein for the passage of air therethrough,
an adjusting member movably supported in said sleeve,
a hand grip affixed to said adjusting member,
a thermostat supported by said adjusting member, and
a spindle connection member engaged between said thermostat and annular member, said sleeve, spindle connecting member, adjusting member and hand grip being made of material having low heat conductivity, and said thermostat including a filling having a high coefficient of thermal expansion over one temperature range and lower coefficients of thermal expansion above and below that range.

References Cited by the Examiner

UNITED STATES PATENTS

| | | | |
|---|---|---|---|
| 1,629,174 | 5/1927 | Patton | 53—12 |
| 1,882,803 | 10/1932 | Giesler | 236—99 X |
| 1,936,325 | 11/1933 | Carson | 236—99 |
| 2,008,400 | 7/1935 | Mott | 236—32 |
| 2,115,501 | 4/1938 | Vernet | 73—358 |
| 2,241,326 | 5/1941 | Selby | 236—99 |
| 2,306,761 | 12/1942 | Smith | 236—99 |
| 2,532,896 | 5/1950 | Dillman | 236—99 |

ALDEN D. STEWART, *Primary Examiner.*